(12) United States Patent
Augusty et al.

(10) Patent No.: US 12,220,973 B2
(45) Date of Patent: Feb. 11, 2025

(54) VISOR ASSEMBLY FOR A VEHICLE

(71) Applicant: Ford Global Technologies, LLC, Dearborn, MI (US)

(72) Inventors: Andrew J. Augusty, Wolverine Lake, MI (US); Paul A. Forgette, Brownstown, MI (US); Satyanarayana R. Vemulapati, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 334 days.

(21) Appl. No.: 17/812,556

(22) Filed: Jul. 14, 2022

(65) Prior Publication Data

US 2024/0017598 A1   Jan. 18, 2024

(51) Int. Cl.
  *B60J 3/02*   (2006.01)
  *B60J 1/20*   (2006.01)

(52) U.S. Cl.
  CPC .......... *B60J 3/0286* (2013.01); *B60J 1/2091* (2013.01)

(58) Field of Classification Search
  CPC ... B60J 3/02; B60J 3/023; B60J 3/0204; B60J 3/0208; B60J 3/0213; B60J 3/0234
  See application file for complete search history.

(56) References Cited

U.S. PATENT DOCUMENTS

| | | |
|---|---|---|
| 4,570,991 A | 2/1986 | Lystad |
| 4,614,375 A | 9/1986 | Miller et al. |
| 5,538,310 A | 7/1996 | Frankhouse et al. |
| 5,577,792 A * | 11/1996 | Muyres ................. B60J 3/0208 296/97.9 |
| 8,038,199 B2 * | 10/2011 | Marcus .................... B60J 3/023 296/97.1 |
| 9,248,721 B1 | 2/2016 | Forgette et al. |
| 9,375,997 B2 | 6/2016 | Tamuraya et al. |
| 9,849,756 B2 | 12/2017 | Juarez Corona |
| 9,902,239 B2 | 2/2018 | Nania |
| 10,011,157 B2 | 7/2018 | Szentkiralyi et al. |
| 10,414,251 B2 | 9/2019 | Yu |
| 2016/0318378 A1 * | 11/2016 | Nedelman ............. B60J 3/0265 |

FOREIGN PATENT DOCUMENTS

| | | |
|---|---|---|
| DE | 10348936 A1 | 6/2005 |
| DE | 102011106146 B4 | 3/2016 |

* cited by examiner

*Primary Examiner* — Abe Massad
(74) *Attorney, Agent, or Firm* — Vichit Chea; Price Heneveld LLP

(57) ABSTRACT

A vehicle includes an A-pillar, a windshield, a receiver, and a visor assembly, including an engagement feature that moves from a first position to a second position, and a biasing feature that biases the engagement feature toward the first position in the second position of the engagement feature. The visor assembly is operable between a stowed condition, wherein the engagement feature is in the first position and the engagement feature and the receiver are in a spaced relationship, and a deployed condition, wherein the engagement feature is in the second position and contact between the engagement feature and the receiver maintains the engagement feature in the second position against the bias of the biasing feature.

17 Claims, 4 Drawing Sheets

VISOR ASSEMBLY FOR A VEHICLE

FIELD OF THE DISCLOSURE

The present invention generally relates to a visor assembly for a vehicle. More specifically, the present invention relates to a visor assembly for a vehicle that includes a biasing feature.

BACKGROUND OF THE DISCLOSURE

Vehicles often include visors for blocking sun that enters the vehicle through the windshield of the vehicle.

SUMMARY OF THE DISCLOSURE

According to one aspect of the present invention, a vehicle includes an A-pillar, a windshield adjacent to the A-pillar, a receiver coupled to the windshield, and a visor assembly pivotably coupled to the A-pillar. The visor assembly includes an engagement feature that is operable to move relative to a portion of the visor assembly from a first position to a second position, and a biasing feature that is configured to bias the engagement feature toward the first position in the second position of the engagement feature. The visor assembly is operable between a stowed condition and a deployed condition. In the stowed condition of the visor assembly, the engagement feature is in the first position and the engagement feature and the receiver are in a spaced relationship. In the deployed condition of the visor assembly, the engagement feature is in the second position and contact between the engagement feature and the receiver maintains the engagement feature in the second position against the bias of the biasing feature. The visor assembly is configured to move between the stowed and deployed conditions via pivotal movement of the engagement feature and the portion of the visor assembly relative to the A-pillar and movement of the engagement feature relative to the portion of the visor assembly.

Embodiments of the first aspect of the invention can include any one or a combination of the following features:
- the visor assembly is pivotably coupled to the A-pillar at a proximal end of the visor assembly, and the maximum distance between the engagement feature and the proximal end in the first position of the engagement feature is greater than the maximum distance between the engagement feature and the proximal end in the second position;
- a length of the visor assembly extends along the A-pillar in the stowed condition, and the length of the visor assembly extends across a portion of the windshield in the deployed condition;
- the visor assembly further includes a visor panel, wherein the visor panel moves with the engagement feature as the engagement feature moves between the first and second positions;
- the visor assembly further includes a support member, wherein the visor panel is operable to pivot about the support member, and the visor panel and the engagement feature move relative to the support member as the engagement feature moves between the first and second positions;
- the visor assembly further includes a visor panel, wherein the engagement feature moves relative to the visor panel between the first and second positions;
- the biasing feature includes a compression spring; and
- the receiver is coupled to a trim panel that is configured to cover a rain sensor mounted to the windshield.

According to another aspect of the present invention, a vehicle includes an A-pillar, a windshield adjacent to the A-pillar, a receiver coupled to the windshield, and a visor assembly pivotably coupled to the A-pillar. The visor assembly includes a visor panel, an engagement feature that is operable to move relative to the visor panel from a first position to a second position, and a biasing feature that is configured to bias the engagement feature toward the first position in the second position of the engagement feature. The visor assembly is operable between a stowed condition and a deployed condition. In the stowed condition of the visor assembly, the engagement feature is in the first position and a length of the visor assembly extends along the A-pillar. In the deployed condition of the visor assembly, the length of the visor assembly extends across a portion of the windshield, the engagement feature is engaged with the receiver, and contact between the engagement feature and the receiver maintains the engagement feature in the second position against the bias of the biasing feature. The visor assembly is configured to move between the stowed and deployed conditions via pivotal movement of the engagement feature and the visor panel relative to the A-pillar and movement of the engagement feature relative to the visor panel.

Embodiments of the second aspect of the invention can include any one or a combination of the following features:
- the visor assembly is pivotably coupled to the A-pillar at a proximal end of the visor assembly, and the biasing feature biases the engagement feature away from the proximal end of the visor assembly in the deployed condition of the visor assembly;
- the biasing feature comprises a compression spring;
- the receiver is coupled to a trim panel that is configured to cover a rain sensor mounted to the windshield;
- the engagement feature is matingly engaged with the receiver in the deployed condition of the visor assembly; and
- contact between the engagement feature and the receiver as the visor assembly enters the deployed condition causes the surface of the portion of the receiver contacted by the engagement feature to deform from a convex surface to a concave surface.

According to another aspect of the present invention, a vehicle includes an A-pillar, a windshield adjacent to the A-pillar, a receiver coupled to the windshield, and a visor assembly pivotably coupled to the A-pillar. The visor assembly includes a visor panel. The visor assembly also includes an engagement feature that is operable to move relative to a portion of the visor assembly from a first position to a second position. The visor panel moves with the engagement feature as the engagement feature moves between the first and second positions. The visor assembly further includes a biasing feature that is configured to bias the engagement feature toward the first position in the second position of the engagement feature. The visor assembly is operable between a stowed condition and a deployed condition. In the stowed condition of the visor assembly, the engagement feature is in the first position. In the deployed condition of the visor assembly, a length of the visor assembly extends across a portion of the windshield, the engagement feature is engaged with the receiver, and contact between the engagement feature and the receiver maintains the engagement feature in the second position against the bias of the biasing feature. The visor assembly is configured to move between the stowed and deployed conditions via pivotal movement of the engagement feature and the visor panel relative to the A-pillar and movement of the engagement feature relative to the visor panel.

Embodiments of the third aspect of the invention can include any one or a combination of the following features:
- the visor assembly is pivotably coupled to the A-pillar at a proximal end of the visor assembly, and the biasing feature biases the engagement feature away from the proximal end of the visor assembly in the deployed condition of the visor assembly;
- the biasing feature comprises a compression spring;
- the receiver is coupled to a trim panel that is configured to cover a rain sensor mounted to the windshield;
- the engagement feature is matingly engaged with the receiver in the deployed condition of the visor assembly; and
- contact between the engagement feature and the receiver as the visor assembly enters the deployed condition causes the surface of the portion of the receiver contacted by the engagement feature to deform from a convex surface to a concave surface.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
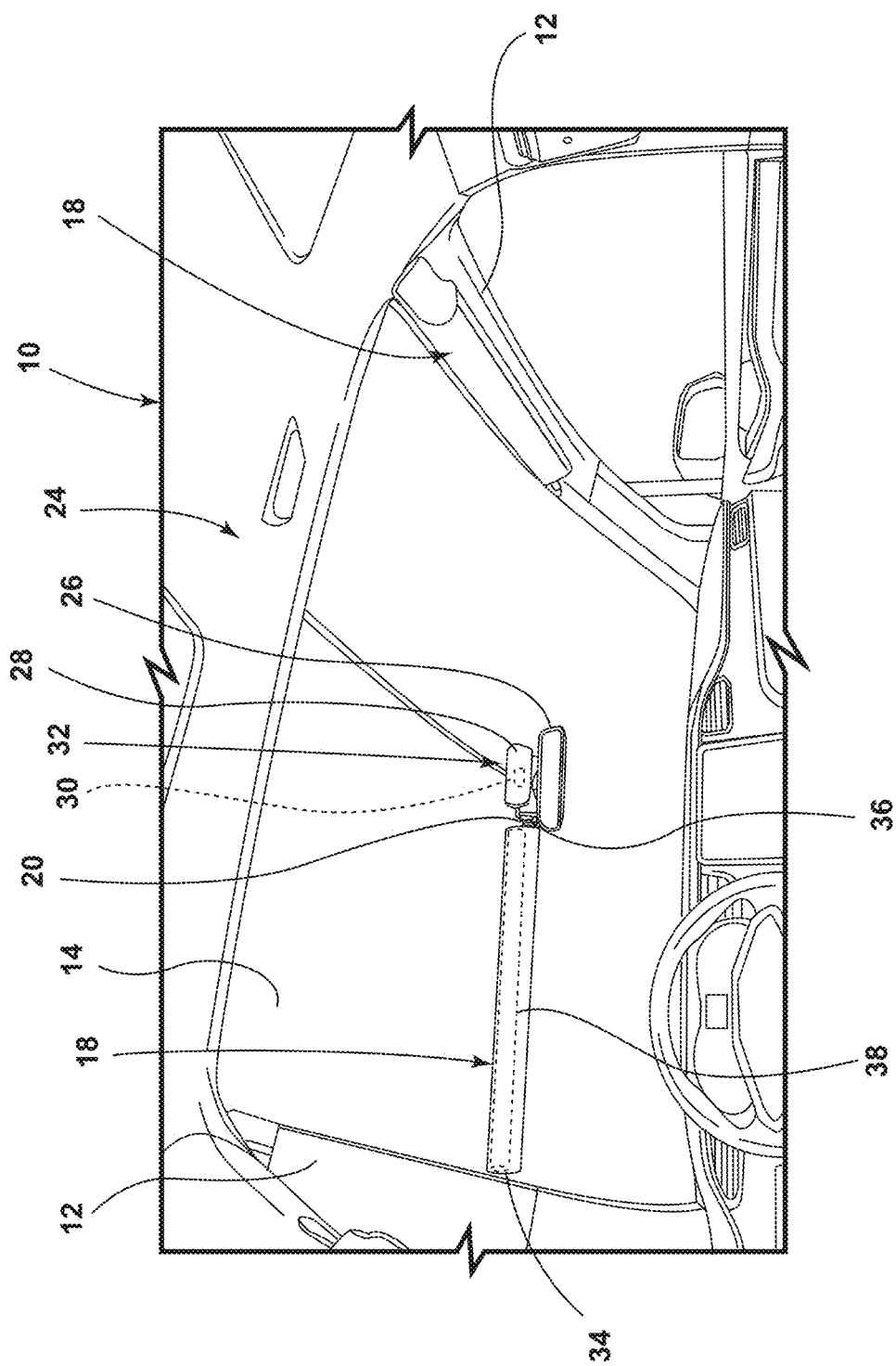
FIG. 1 is a perspective view of a vehicle interior of a vehicle, illustrating a visor assembly in a deployed condition, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-7, a vehicle 10 includes an A-pillar 12. A windshield 14 is adjacent to the A-pillar 12. A receiver 16 is coupled to the windshield 14. A visor assembly 18 is pivotably coupled to the A-pillar 12. The visor assembly 18 includes an engagement feature 20 and a biasing feature 22. The engagement feature 20 is operable to move relative to a portion of the visor assembly 18 from a first position to a second position. The biasing feature 22 is configured to bias the engagement feature 20 toward the first position in the second position of the engagement feature 20. The visor assembly 18 is operable between a stowed condition and a deployed condition. In the stowed condition, the engagement feature 20 is in the first position, and the engagement feature 20 and receiver 16 are in a spaced relationship. In the deployed condition, the engagement feature 20 is in the second position and contact between the engagement feature 20 and the receiver 16 maintains the engagement feature 20 in the second position against the bias of the biasing feature 22. The visor assembly 18 is configured to move between the stowed and deployed conditions via pivotal movement of the engagement feature 20 and the portion of the visor assembly 18 relative to the A-pillar 12 and movement of the engagement feature 20 relative to the portion of the visor assembly 18.

Referring now to FIG. 1, the vehicle 10 includes a vehicle interior 24. As illustrated in FIG. 1, the vehicle 10 includes the A-pillar 12 and the windshield 14 that is adjacent to the A-pillar 12. The windshield 14 is a front windshield 14 of the vehicle 10. In various embodiments, the windshield 14 is an oversized windshield 14 that extends vehicle-rearward further than a typical front windshield 14 of a vehicle 10. As illustrated in FIG. 1, the windshield 14 extends vehicle-rearward such that a rearview mirror 26 is mounted to an interior surface of the windshield 14, and the windshield 14 extends rearward from the rearview mirror 26. In various implementations, the receiver 16 is coupled to the windshield 14. The receiver 16 may be coupled to the interior surface of the windshield 14. As described further herein, the receiver 16 may be configured to receive the engagement feature 20 of the visor assembly 18 in the deployed condition of the visor assembly 18. In various embodiments, the receiver 16 can be coupled to the windshield 14 by being coupled to a trim panel 28 that is configured to cover a rain sensor 30 mounted to the windshield 14. In some implementations, the receiver 16 is disposed at a rearview mirror mounting assembly 32 that couples the rearview mirror 26 to the interior surface of the windshield 14 of the vehicle 10.

Figure 3:
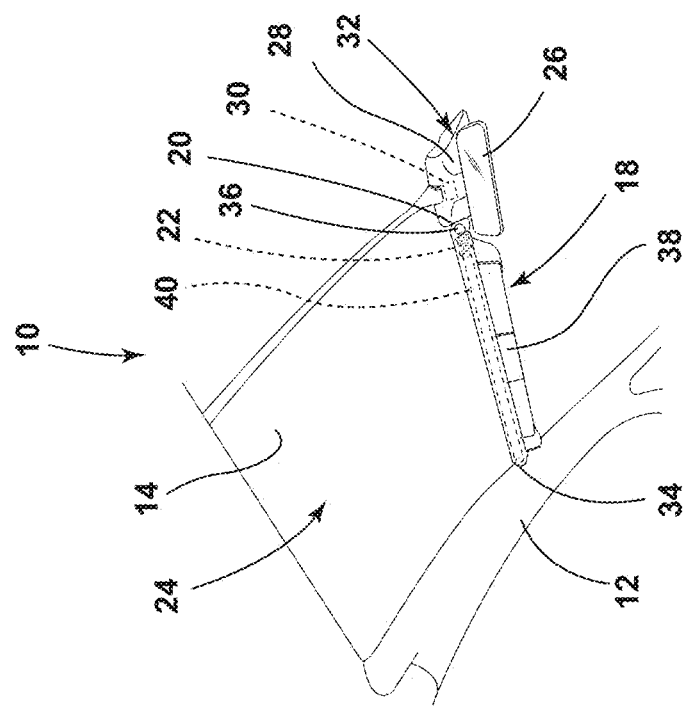
FIG. 3 is a side perspective view of a portion of a vehicle interior of a vehicle, illustrating a visor assembly pivotably coupled to the A-pillar and in a deployed condition, according to one embodiment.
Figure 2:
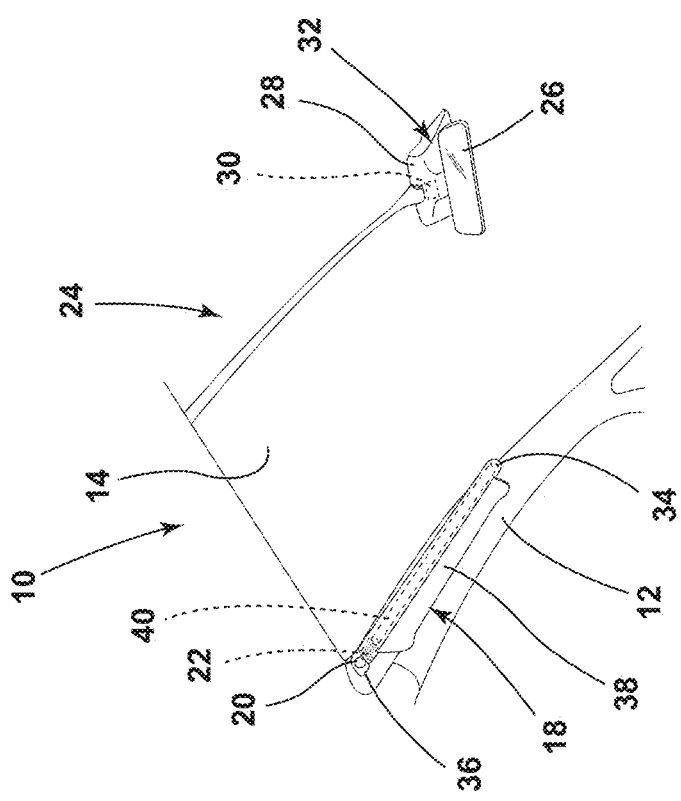
FIG. 2 is a side perspective view of a portion of a vehicle interior, illustrating a visor assembly extending along an A-pillar of the vehicle in a stowed condition of the visor assembly, according to one embodiment.

Referring now to FIGS. 1-3, the vehicle 10 includes the visor assembly 18. The visor assembly 18 may be pivotably coupled to the A-pillar 12 of the vehicle 10, as illustrated in FIGS. 1-3. The visor assembly 18 illustrated in FIGS. 1-3 is pivotably coupled to the A-pillar 12 at a proximal end 34 of the visor assembly 18, and the visor assembly 18 extends from the proximal end 34 to a distal end 36 of the visor assembly 18 along a length of the visor assembly 18. The visor assembly 18 may be operable between a stowed condition, as illustrated in FIG. 2, and a deployed condition, as illustrated in FIG. 3, via at least pivotal movement of the visor assembly 18 relative to the A-pillar 12, as described further herein.

Referring now to FIGS. 2-7, the visor assembly 18 includes a visor panel 38. The visor panel 38 is configured to shade a user within the vehicle interior 24 from sun entering through the windshield 14 and/or another window of the vehicle 10. The visor assembly 18 may further include a support member 40. The support member 40 can extend along the visor panel 38, as illustrated in FIGS. 2 and 3. In some implementations, the visor assembly 18 may be pivotably coupled to the A-pillar 12 via the support member 40. In some implementations, the support member 40 may include a rod that extends outward from the A-pillar 12 and within the visor panel 38 of the visor assembly 18. In some implementations, the visor panel 38 may be configured to pivot about the support member 40 that extends within the visor panel 38. As such, the visor assembly 18 may pivot relative to the A-pillar 12 and the visor panel 38 may pivot relative to the support member 40. As illustrated in FIGS. 3-7, the visor panel 38 of the visor assembly 18 can include a vanity mirror 42.

Figure 7:
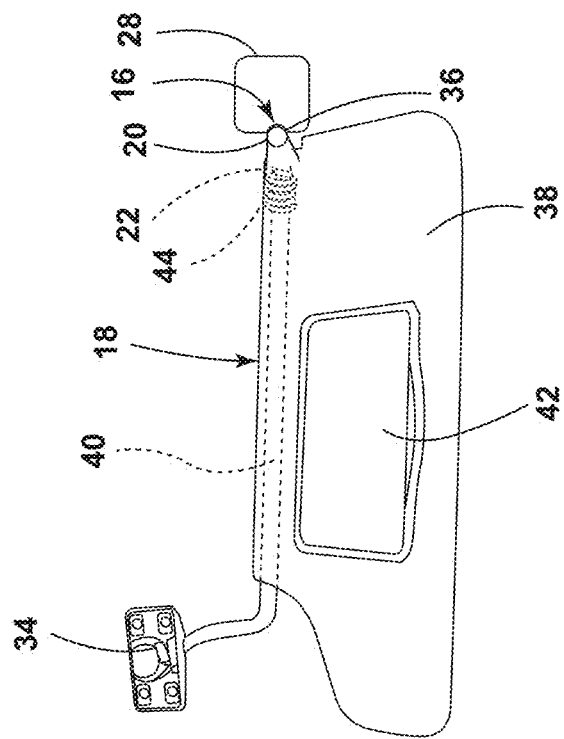
FIG. 7 is a front elevational view of the visor assembly and the receiver, illustrating the engagement feature in a second position, wherein the engagement feature is engaged with the receiver, according to one embodiment.

Referring still to FIGS. 2-7, the visor assembly 18 includes the engagement feature 20. The engagement feature 20 is configured to be selectively engaged with the receiver 16, as described further herein. As illustrated in FIGS. 2-7, in various implementations, the engagement feature 20 may be positioned at and/or form the distal end 36 of the visor assembly 18. The engagement feature 20 may be configured to engage with the receiver 16 in a variety of ways, in various embodiments. For example, in some embodiments, the engagement feature 20 may be matingly engaged with the receiver 16, as illustrated in FIG. 7. In some implementations, the receiver 16 may deform due to contact between the receiver 16 and the engagement feature 20 as the engagement feature 20 engages the receiver 16, as described further herein. In some embodiments, the engagement feature 20 includes a post that has a generally circular profile to allow for rotational movement of the engagement feature 20 within the receiver 16 to accommodate adjustment of the visor assembly 18. In some embodiments, the engagement feature 20 can include a ball, such as a metal ball used in a bearing. The ball may be operably coupled with the visor assembly 18, such that the ball is omnidirectionally rotatable relative to a portion of the visor assembly 18. The omnidirectionally rotatable ball of the engagement feature 20 may allow for adjustment of the position of portions of the visor assembly 18 when the engagement feature 20 is engaged with the receiver 16.

Figure 5:
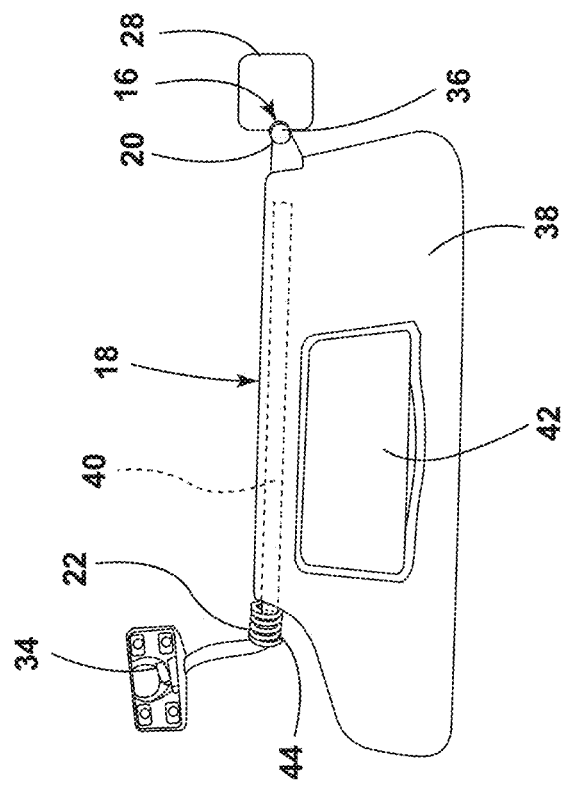
FIG. 5 is a front elevational view of the visor assembly and the receiver, illustrating the engagement feature in a second position, wherein the engagement feature is engaged with the receiver, according to one embodiment.
Figure 4:
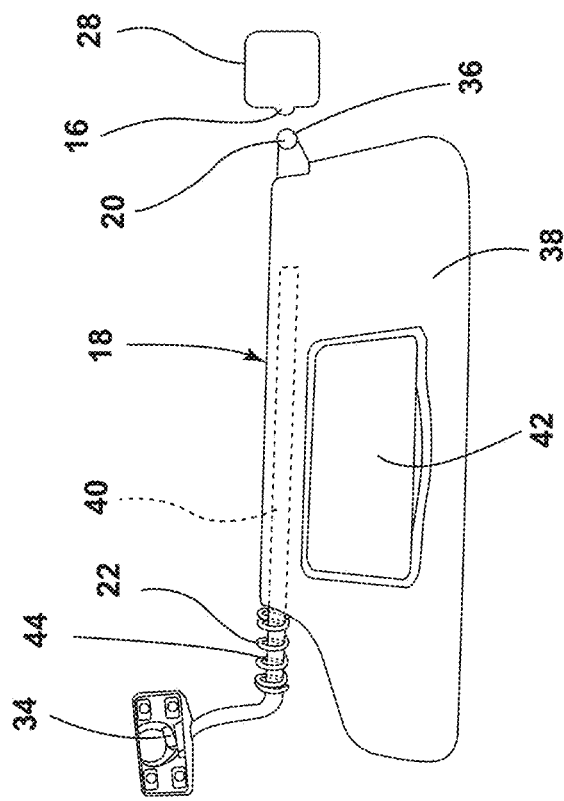
FIG. 4 is a front elevational view of a visor assembly and a receiver, illustrating an engagement feature in a first position, wherein the engagement feature is in a spaced relationship with the receiver, according to one embodiment.

Referring now to FIGS. 4 and 5, an embodiment of the receiver 16 is illustrated. As illustrated in FIG. 4, wherein the engagement feature 20 of the visor assembly 18 is disengaged from the receiver 16, a portion of the surface of the receiver 16 that is configured to be contacted by the engagement feature 20 when the engagement feature 20 is engaged with the receiver 16 is a convex surface. In operation, as the engagement feature 20 is engaged with the receiver 16, contact between the engagement feature 20 and the receiver 16 causes the surface of the portion of the receiver 16 that is contacted by the engagement feature 20 to deform from a convex surface to a concave surface, as illustrated in FIG. 5. Upon disengagement of the engagement feature 20 from the receiver 16, the receiver 16 may resiliently rebound back, such that the convex surface is reformed, as illustrated in FIG. 4. A variety of types of receivers 16 are contemplated (e.g., depression, recess, socket, aperture, etc.).

Referring now to FIGS. 4-7, in various embodiments, the engagement feature 20 is operable to move relative to a portion of the visor assembly 18 between a first position and a second position. In some implementations, the maximum distance between the engagement feature 20 and the proximal end 34 of the visor assembly 18 in the first position of the engagement feature 20 is greater than the maximum distance between the engagement feature 20 and the proximal end 34 of the visor assembly 18 in the second position. For example, as illustrated in FIGS. 4 and 5, in the first position, as illustrated in FIG. 4, the maximum distance between the engagement feature 20 and the proximal end 34 of the visor assembly 18 is greater than the maximum distance between the engagement feature 20 and the proximal end 34 of the visor assembly 18 in the second position of the engagement feature 20, as illustrated in FIG. 5. As such, at least a portion of the engagement feature 20 may move away from the proximal end 34 of the visor assembly 18 as the engagement feature 20 moves from the second position to the first position.

Figure 6:
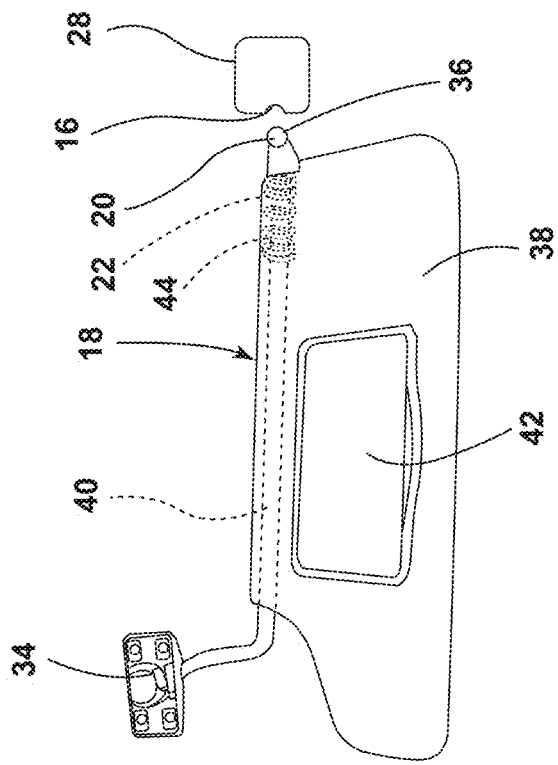
FIG. 6 is a front elevational view of a visor assembly and a receiver, illustrating an engagement feature in a first position, wherein the engagement feature is in a spaced relationship with the receiver, according to one embodiment.

Referring still to FIGS. 4-7, in some implementations, the engagement feature 20 moves relative to the visor panel 38 between the first and second positions. For example, as illustrated in FIGS. 6 and 7, the engagement feature 20 moves relative to the visor panel 38 from the first position, as illustrated in FIG. 6, to the second position, as illustrated in FIG. 7. In some embodiments, wherein the engagement feature 20 is operable to move relative to a portion of the visor assembly 18 between the first and second positions, the visor panel 38 moves with the engagement feature 20 as the engagement feature 20 moves between the first and second positions. For example, as illustrated in FIGS. 4 and 5, the visor panel 38 moves with the engagement feature 20 as the engagement feature 20 moves relative to the support member 40 from the first position, as illustrated in FIG. 4, to the second position, as illustrated in FIG. 5. It is contemplated that the engagement feature 20 may move relative to a variety of portions of the visor assembly 18, in various embodiments.

Referring still to FIGS. 4-7, the visor assembly 18 can include the biasing feature 22. The biasing feature 22 may be configured to bias the engagement feature 20 toward the first position in the second position of the engagement feature 20. In other words, when the engagement feature 20 is in the second position, the biasing feature 22 may be configured to bias the engagement feature 20 toward the first position. In the embodiment illustrated in FIGS. 4 and 5, the biasing feature 22 is configured to bias the engagement feature 20 via exertion of a force on the visor panel 38 that is coupled to the engagement feature 20. In the illustrated embodiment, the biasing feature 22 is a compression spring 44 that is disposed about a portion of the support member 40 proximate to the proximal end 34 of the visor assembly 18. As illustrated in FIG. 4, wherein the engagement feature 20 is in the first position, the compression spring 44 is generally decompressed. As illustrated in FIG. 5, wherein the engagement feature 20 is engaged with the receiver 16 and in the second position, the visor panel 38 and the engagement feature 20 are nearer to the proximal end 34 of the visor assembly 18, and the compression spring 44 is compressed such that a biasing force is exerted on the visor panel 38 and the engagement feature by the biasing feature 22. In the embodiment illustrated in FIGS. 6 and 7, the biasing feature 22 is configured to bias the engagement feature 20 to move relative to the visor panel 38. For example, in the embodiment illustrated in FIG. 7, wherein the engagement feature 20 is engaged with the receiver 16 in the second position of the engagement feature 20, the biasing feature 22 is biasing the engagement feature 20 to move relative to the visor panel 38 toward the first position, as illustrated in FIG. 6.

Referring now to FIGS. 2-7, the visor assembly 18 is operable between the stowed condition and the deployed condition. In some embodiments, in the stowed condition, the engagement feature 20 of the visor assembly 18 is in the first position and the engagement feature 20 and receiver 16 are in a spaced relationship, as illustrated in FIGS. 2, 4, and 6. In the deployed condition of the visor assembly 18, the engagement feature 20 is in the second position and contact between the engagement feature 20 and the receiver 16 maintains the engagement feature 20 in the second position against the bias of the biasing feature 22, as illustrated in FIGS. 5 and 7. In some embodiments, in the stowed condition of the visor assembly 18, the length of the visor assembly 18 extends along the A-pillar 12, as illustrated in FIG. 2. In the deployed condition of the visor assembly 18, the length of the visor assembly 18 extends across a portion of the windshield 14, as illustrated in FIG. 3. In the embodiment illustrated in FIG. 3, the length of the visor assembly 18 extends from the proximal end 34 of the visor assembly 18 vehicle-laterally inboard to the distal end 36 of the visor assembly 18. As illustrated in FIG. 3, in the deployed condition of the visor assembly 18, the visor assembly 18 extends between the A-pillar 12 and the receiver 16 which is coupled to the trim panel 28 that is configured to cover the rain sensor 30 mounted to the windshield 14.

Referring still to FIGS. 2-7, in various embodiments, the visor assembly 18 is configured to move between the stowed and deployed conditions via pivotal movement of various components of the visor assembly 18 and movement of the engagement feature 20 from the first position to the second position. For example, in an exemplary embodiment, the support member 40, visor panel 38, biasing feature 22, and engagement feature 20 pivot relative to the A-pillar 12, as illustrated in FIGS. 2 and 3, and the engagement feature 20 moves from the first position, as illustrated in FIG. 2, to the second position, to move the visor assembly 18 from the stowed condition to the deployed condition. In various embodiments, the visor assembly 18 is pivotably coupled to the A-pillar 12 at a proximal end 34 of the visor assembly 18, and the biasing feature 22 biases the engagement feature 20 away from the proximal end 34 of the visor assembly 18 in the deployed condition of the visor assembly 18.

In operation of an exemplary embodiment of a vehicle 10 that includes the visor assembly 18, initially, the visor assembly 18 is in the stowed condition, such that the length of the visor assembly 18 extends along the A-pillar 12 of the vehicle 10, as illustrated in FIG. 2. Next, a user, desiring to shield themselves from sun entering the vehicle interior 24 through the windshield 14, pivots the visor assembly 18, such that the length of the visor assembly 18 extends across a portion of the windshield 14, as illustrated in FIG. 3. The user then engages the engagement feature 20 with the receiver 16 coupled to the interior surface of the windshield 14. As such, the engagement feature 20 is moved from the first position to the second position, and the biasing feature 22 biases the engagement feature 20 toward the first position to securely hold the engagement feature 20 within the receiver 16 in the deployed condition of the visor assembly 18.

The visor assembly 18 of the present disclosure may provide a variety of advantages. First, the receiver 16 being coupled to the interior surface of the windshield 14 and being incorporated into the trim panel 28 of the rain sensor 30 and/or the mounting assembly 32 of the rearview mirror 26 efficiently provides a support structure for the visor assembly 18 in the deployed condition of the visor assembly 18. Second, the biasing feature 22 biasing the engagement feature 20 toward the first position may aid in maintaining the visor assembly 18 securely in the deployed condition.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle, comprising:
   an A-pillar;
   a windshield adjacent to the A-pillar;
   a receiver coupled to the windshield; and
   a visor assembly pivotably coupled to the A-pillar at a proximal end of the visor assembly and comprising:
   an engagement feature that is operable to move relative to a portion of the visor assembly from a first position to a second position, wherein a maximum distance between the engagement feature and the proximal end in the first position of the engagement feature is greater than a maximum distance between the engagement feature and the proximal end in the second position of the engagement feature; and
   a biasing feature that is configured to bias the engagement feature toward the first position in the second position of the engagement feature, the visor assembly being operable between a stowed condition, wherein the engagement feature is in the first position and the engagement feature and the receiver are in a spaced relationship, and a deployed condition, wherein the engagement feature is in the second position and contact between the engagement feature and the receiver maintains the engagement feature in the second position against the bias of the biasing feature, and wherein the visor assembly is configured to move between the stowed and deployed conditions via pivotal movement of the engagement feature and the portion of the visor assembly relative to the A-pillar and movement of the engagement feature relative to the portion of the visor assembly.

2. The vehicle of claim 1, wherein a length of the visor assembly extends along the A-pillar in the stowed condition, and the length of the visor assembly extends across a portion of the windshield in the deployed condition.

3. The vehicle of claim 1, wherein the visor assembly further comprises:
a visor panel, wherein the visor panel moves with engagement feature as the engagement feature moves between the first and second positions.

4. The vehicle of claim 3, wherein the visor assembly further comprises:
a support member, wherein the visor panel is operable to pivot about the support member, and the visor panel and the engagement feature move relative to the support member as the engagement feature moves between the first and second positions.

5. The vehicle of claim 1, wherein the visor assembly further comprises:
a visor panel, wherein the engagement feature moves relative to the visor panel between the first and second positions.

6. The vehicle of claim 1, wherein the biasing feature comprises:
a compression spring.

7. The vehicle of claim 1, wherein the receiver is coupled to a trim panel that is configured to cover a rain sensor mounted to the windshield.

8. A vehicle, comprising:
an A-pillar;
a windshield adjacent to the A-pillar;
a receiver coupled to the windshield; and
a visor assembly pivotably coupled to the A-pillar and comprising:
a visor panel;
an engagement feature that is operable to move relative to the visor panel from a first position to a second position, wherein contact between the engagement feature and the receiver as the engagement feature enters the second position causes a surface of a portion of the receiver contacted by the engagement feature to deform from a convex surface to a concave surface; and
a biasing feature that is configured to bias the engagement feature toward the first position in the second position of the engagement feature, the visor assembly being operable between a stowed condition, wherein the engagement feature is in the first position and a length of the visor assembly extends along the A-pillar, and a deployed condition, wherein the length of the visor assembly extends across a portion of the windshield, the engagement feature is engaged with the receiver, and contact between the engagement feature and the receiver maintains the engagement feature in the second position against the bias of the biasing feature, and wherein the visor assembly is configured to move between the stowed and deployed conditions via pivotal movement of the engagement feature and visor panel relative to the A-pillar and movement of the engagement feature relative to the visor panel.

9. The vehicle of claim 8, wherein the visor assembly is pivotably coupled to the A-pillar at a proximal end of the visor assembly, and the biasing feature biases the engagement feature away from the proximal end of the visor assembly in the deployed condition of the visor assembly.

10. The vehicle of claim 8, wherein the biasing feature comprises:
a compression spring.

11. The vehicle of claim 8, wherein the receiver is coupled to a trim panel that is configured to cover a rain sensor mounted to the windshield.

12. The vehicle of claim 8, wherein the engagement feature is matingly engaged with the receiver in the deployed condition of the visor assembly.

13. A vehicle, comprising:
an A-pillar;
a windshield adjacent to the A-pillar;
a rain sensor coupled to the windshield;
a trim panel that covers the rain sensor;
a receiver coupled to the trim panel; and
a visor assembly pivotably coupled to the A-pillar and comprising:
a visor panel;
an engagement feature that is operable to move relative to a portion of the visor assembly from a first position to a second position, wherein the visor panel moves with the engagement feature as the engagement feature moves between the first and second positions; and
a biasing feature that is configured to bias the engagement feature toward the first position in the second position of the engagement feature, the visor assembly being operable between a stowed condition, wherein the engagement feature is in the first position, and a deployed condition, wherein a length of the visor assembly extends across a portion of the windshield, the engagement feature is engaged with the receiver, and contact between the engagement feature and the receiver maintains the engagement feature in the second position against the bias of the biasing feature, and wherein the visor assembly is configured to move between the stowed and deployed conditions via pivotal movement of the engagement feature and visor panel relative to the A-pillar and movement of the engagement feature relative to the visor panel.

14. The vehicle of claim 13, wherein the visor assembly is pivotably coupled to the A-pillar at a proximal end of the visor assembly, and the biasing feature biases the engagement feature away from the proximal end of the visor assembly in the deployed condition of the visor assembly.

15. The vehicle of claim 13, wherein the biasing feature comprises:
a compression spring.

16. The vehicle of claim 13, wherein the engagement feature is matingly engaged with the receiver in the deployed condition of the visor assembly.

17. The vehicle of claim 13, wherein contact between the engagement feature and receiver as the visor assembly enters the deployed condition causes a surface of a portion of the receiver contacted by the engagement feature to deform from a convex surface to a concave surface.

* * * * *